(12) United States Patent
Durham et al.

(10) Patent No.: US 12,045,174 B2
(45) Date of Patent: Jul. 23, 2024

(54) TAGLESS IMPLICIT INTEGRITY WITH MULTI-PERSPECTIVE PATTERN SEARCH

(71) Applicant: Intel Corporation, Santa Clara, CA (US)

(72) Inventors: David M. Durham, Beaverton, OR (US); Michael Lemay, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 286 days.

(21) Appl. No.: 17/704,771

(22) Filed: Mar. 25, 2022

(65) Prior Publication Data

US 2022/0222183 A1    Jul. 14, 2022

(51) Int. Cl.
*G06F 12/14* (2006.01)
*G06F 9/30* (2018.01)

(52) U.S. Cl.
CPC ...... *G06F 12/1408* (2013.01); *G06F 9/30043* (2013.01); *G06F 12/1441* (2013.01); *G06F 12/1458* (2013.01)

(58) Field of Classification Search
CPC ............. G06F 12/1408; G06F 9/30043; G06F 12/1441; G06F 12/1458; G06F 2212/1044; G06F 2212/1052; G06F 12/08; G06F 2212/402
See application file for complete search history.

(56) References Cited

U.S. PATENT DOCUMENTS

| 2019/0042734 A1* | 2/2019 | Kounavis | ........... G06F 21/54 |
| 2020/0117810 A1 | 4/2020 | Kounavis et al. | |
| 2020/0125770 A1* | 4/2020 | LeMay | .......... H04L 9/3242 |

(Continued)

FOREIGN PATENT DOCUMENTS

| CN | 116805083 A | 9/2023 | |
| WO | WO-2021151480 A1 * | 8/2021 | ........... H04L 9/0662 |

OTHER PUBLICATIONS

Bernhard, Lukas, et al. "xTag: Mitigating Use-After-Free Vulnerabilities via Software-Based Pointer Tagging on Intel x86-64." 2022 IEEE 7th European Symposium on Security and Privacy (EuroS &P). IEEE, 2022. (Year: 2022).*

(Continued)

*Primary Examiner* — Michael R Vaughan
(74) *Attorney, Agent, or Firm* — JAFFERY WATSON MENDONSA & HAMILTON LLP

(57) ABSTRACT

Embodiments are directed to tagless implicit integrity with multi-perspective pattern search for memory safety. An embodiment of an apparatus includes one or more processors comprising hardware circuitry to: access encrypted data stored in a memory hierarchy using a pointer; decrypt the encrypted data using a current version of a pointer tag of the pointer to yield first decrypted data; perform an entropy test on the first decrypted data; responsive to the entropy test failing to detect patterns in the first decrypted data, re-decrypt the encrypted data using one or more different versions of the pointer tag of the pointer to yield one or more other decrypted data; perform the entropy test on the one or more other decrypted versions; and responsive to the entropy test detecting the patterns in the one or more other decrypted data, signal an exception to the one or more processors with respect to the encrypted data.

20 Claims, 8 Drawing Sheets

(56) References Cited

U.S. PATENT DOCUMENTS

| | | | |
|---|---|---|---|
| 2020/0201789 A1* | 6/2020 | Durham | G06F 21/602 |
| 2022/0121447 A1* | 4/2022 | Basak | G06F 9/30043 |
| 2022/0358116 A1* | 11/2022 | Boivie | G06F 16/2282 |
| 2022/0382885 A1* | 12/2022 | Durham | G06F 12/0646 |
| 2023/0018585 A1* | 1/2023 | Liljestrand | G06F 3/0655 |

OTHER PUBLICATIONS

Jaewon Lee, Yonghae Kim, Jiashen Cao, Euna Kim, Jaekyu Lee, and Hyesoon Kim. 2022. Securing GPU via region-based bounds checking. In Proceedings of the 49th Annual International Symposium on Computer Architecture (ISCA '22). Association for Computing Machinery, New York, NY, USA, 27-41. (Year: 2022).*

Chen, Tony, and David Chisnall. "Pointer Tagging for Memory Safety." (2019). (Year: 2019).*

Michael Kounavis et al., "Security Definitions, Entropy Measures and Constructions for Implicitly Detecting Data Corruption," Nov. 2019, 65 pages, Intel Corporation.

* cited by examiner

400

```
┌─────────────────────────────────────────────────────────┐
│ Access encrypted data stored in a memory hierarchy      │
│ using a pointer                                          │
│                                                      410 │
└─────────────────────────────────────────────────────────┘
                            │
                            ▼
┌─────────────────────────────────────────────────────────┐
│ Decrypt the encrypted data using a current version of a │
│ pointer tag of the pointer to yield first decrypted data│
│                                                      420 │
└─────────────────────────────────────────────────────────┘
                            │
                            ▼
┌─────────────────────────────────────────────────────────┐
│ Perform an entropy test on the first decrypted data     │
│                                                      430 │
└─────────────────────────────────────────────────────────┘
                            │
                            ▼
┌─────────────────────────────────────────────────────────┐
│ Responsive to the entropy test failing to detect        │
│ patterns in the decrypted data, decrypt the encrypted   │
│ data using one or more different versions of the        │
│ pointer tag of the pointer to yield one or more other   │
│ decrypted data                                           │
│                                                      440 │
└─────────────────────────────────────────────────────────┘
                            │
                            ▼
┌─────────────────────────────────────────────────────────┐
│ Perform the entropy test on the one or more other       │
│ decrypted data                                           │
│                                                      450 │
└─────────────────────────────────────────────────────────┘
                            │
                            ▼
┌─────────────────────────────────────────────────────────┐
│ Responsive to the entropy test detecting the patterns   │
│ in the one or more other decrypted data, signal an      │
│ exception to the processor with respect to the          │
│ encrypted data                                           │
│                                                      460 │
└─────────────────────────────────────────────────────────┘
```

┌─────────────────────────────────────────────┐
│ Access encrypted data stored in a buffer data structure using a pointer |
│ 610 │
└─────────────────────────────────────────────┘
↓
┌─────────────────────────────────────────────┐
│ Decrypt the encrypted data using a current version of a pointer tag of the pointer and buffer size to yield first decrypted data |
│ 620 │
└─────────────────────────────────────────────┘
↓
┌─────────────────────────────────────────────┐
│ Perform an entropy test on the first decrypted data |
│ 630 │
└─────────────────────────────────────────────┘
↓
┌─────────────────────────────────────────────┐
│ Responsive to the entropy test failing to detect patterns in the decrypted data used to delineate the buffer data structure from an adjacent buffer data structure, decrypt the encrypted data using one or more different versions of the pointer tag of the pointer and buffer size to yield one or more other decrypted data |
│ 640 │
└─────────────────────────────────────────────┘
↓
┌─────────────────────────────────────────────┐
│ Perform the entropy test on the one or more other decrypted data |
│ 650 │
└─────────────────────────────────────────────┘
↓
┌─────────────────────────────────────────────┐
│ Responsive to the entropy test detecting the patterns in the one or more other decrypted data, signal an exception to the processor indicating a buffer overflow into the adjacent buffer data structure |
│ 660 │
└─────────────────────────────────────────────┘

*FIG. 6*

TAGLESS IMPLICIT INTEGRITY WITH MULTI-PERSPECTIVE PATTERN SEARCH

TECHNICAL FIELD

Embodiments described herein generally relate to the field of computing systems and, more particularly, tagless implicit integrity with multi-perspective pattern search.

BACKGROUND

Cryptographic computing may refer to solutions for computer system security that employ cryptographic mechanisms inside processor components. Some cryptographic computing systems may employ encryption and/or other cryptographic mechanisms inside a processor core on memory pointers or user data before such data leave the processor boundary and enter some external memory unit or are communicated to some other device. Furthermore, encryptions and decryptions may be part of memory load and store operations. Such flexible encryption operations can substantially reduce the typical overheads associated with current solutions such as accessing tables with permissions, memory ranges, memory tags, or other security metadata, as such tables may be large, stored in external memory units, and be time consuming to access.

BRIEF DESCRIPTION OF THE DRAWINGS

Embodiments described here are illustrated by way of example, and not by way of limitation, in the figures of the accompanying drawings in which like reference numerals refer to similar elements.

FIG. 4 illustrates an example flow for tagless implicit integrity with multi-perspective pattern search, in accordance with certain embodiments.

FIG. 6 illustrates an example flow for tagless implicit integrity with multi-perspective pattern search to detect a boundary overflow, in accordance with certain embodiments.

DETAILED DESCRIPTION

Figure 1:
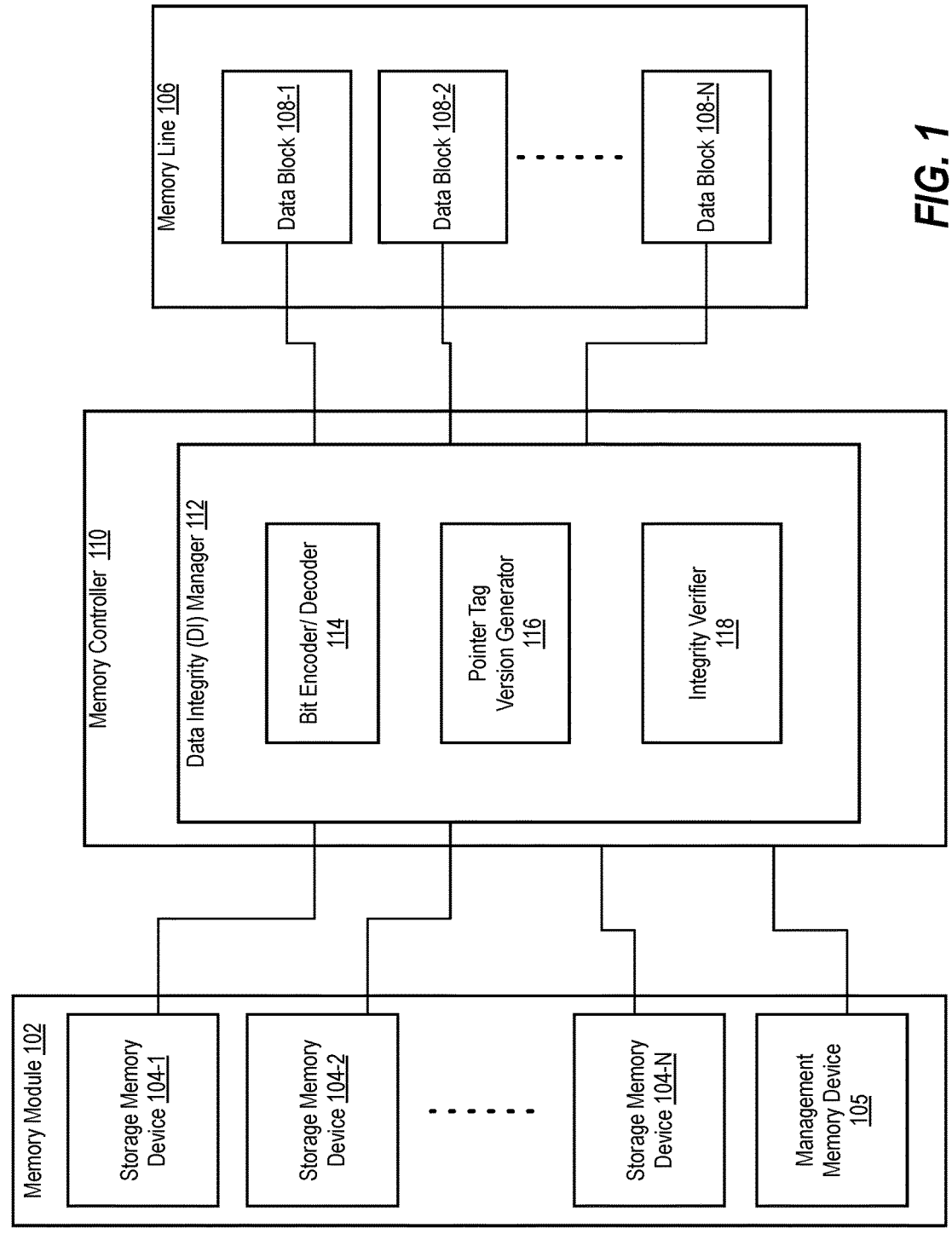
FIG. 1 illustrates a computing device for tagless implicit integrity with multi-perspective pattern search, in accordance with certain embodiments.

Various embodiments are directed to techniques for tagless implicit integrity with multi-perspective pattern search, for instance.

Cryptographic computing may refer to solutions for computer system security that employ cryptographic mechanisms inside processor components. Some cryptographic computing systems may employ encryption and/or other cryptographic mechanisms inside a processor core on memory pointers or user data before such data leave the processor boundary and enter some external memory unit or are communicated to some device. Such flexible encryption operations can substantially reduce the typical overheads associated with current solutions such as accessing tables with permissions, memory ranges or other security metadata, as such tables may be large, stored in external memory units, and be time consuming to access.

Data integrity is an important aspect of computing. Data corruption may occur in various instances, and detection of any data corruption can prevent many issues. In some current systems, corruption detection is implemented by producing, storing, and validating Message Authentication Codes (MACs) such as K-MAC SHA3 codes, which are cryptographically strong. However, there is a cost in terms of space and compute power associated with the use of the additional metadata related to the use of MACs, and the cost may be substantially increased if memory load and store operations perform the cryptographic art of the processing in the processor core (such as in cryptographic computing implementations). For example, each cache line and register should be augmented with space for storing a MAC. Such computation cost may be included in the overall delay of the compute pipeline, etc.

Implementations herein may provide data integrity and exploit prevention, including prevention of software bugs, exploits, and vulnerabilities, while avoiding some of the disadvantages of current techniques (e.g., the costs described above with respect to the use of MACs). In some embodiments, for example, data integrity and exploit prevention can be supported at the processor core in the context of cryptographic computing, and as part of encrypted memory load and store operations, by using implicit integrity checks. The principle behind implicit integrity can generally be described as follows. User data is typically of low entropy and usually demonstrates patterns (e.g., a number of equal bytes exceeding a threshold may be present in the data of a certain number of bytes, or the number of two highest nibble frequencies may exceed a threshold, etc.). Where data is encrypted, corruptions on the ciphertext or use of the wrong cryptographic key or tweak may result in decrypted plaintexts without the patterns. By checking for patterns or for the low entropy status of some decrypted content, data corruption may be detected.

In some embodiments, implicit integrity checks can be supported in the processor core by updating a processor state (which is accessible by software) when data is decrypted in the core to indicate potential integrity violations. The software may be able to react to the potential integrity violations by reading the relevant processor state information. In certain embodiments, a processor state, such as a bit in the flag register, may be utilized to indicate integrity violations, and new instructions (e.g., branch instructions) may react to the flag bit. The instructions may be part of an instruction set architecture (ISA) of a processor. Other embodiments may trigger exceptions, invoking a software exception handler, or interrupt handler or fault handler, etc.

Embodiments of the disclosure address the above-noted challenges of the use of memory tagging technologies by providing tagless implicit integrity with multi-perspective pattern search. The tagless implicit integrity with multi-perspective pattern search approach of implementations of the disclosure allows for detection of data integrity violations (e.g., exploits, bugs, vulnerabilities, use-after-free (UAF), etc.) in accessed data. A pointer having a pointer tag version as part of the pointer (e.g., virtual address/linear address) may be used to encrypt/decrypt data. This tag value may be used as a tweak to a tweakable encryption algorithm or a counter or initialization value for a stream cipher in order to make the ciphertext dependent on the tweak value in combination with a secret key. When the data is later decrypted using the tag value in the accessing pointer, the data is checked for patterns (e.g., low entropy). If no patterns are revealed, then implementations herein update the pointer tag version of the pointer and re-decrypt the data to check whether patterns exist in the re-decrypted data for adjacent versions. Additional pointer tag versions and pattern testing may be applied to the data to determine whether any other versions of the pointer produce patterns in the data. By checking other versions of the pointer, implementations can identify potential data integrity violations (such as use after free (UAF) exploits and buffer overflow/underflow) in the data access. That is, if patterns are exhibited in another version of the pointer than the pointer used to access the data, and the current pointer version used to decrypt the data does not reveal patterns, the data is most likely owned by another version of the pointer that a previous (freed) version of the pointer is being used to access (use-after-free).

Implementations herein provide for technical advantages of reduced memory storage requirements where the memory encryption model does not utilize any additional tag storage. Furthermore, implementations herein provide for improved performance of the processor due to avoiding additional memory accesses to retrieve tag data values to compare with a tag value included as part of the pointer for every granule of tagged memory. The memory encryption scheme of implementations herein does not utilize a large number of memory accesses to update tag values on memory allocation or free events. These savings are then passed on to the end user in terms of memory usage efficiency and performance.

FIG. 1 illustrates a system 100 for tagless implicit integrity with multi-perspective pattern search in accordance with certain embodiments. System 100 may include a memory module 102 with storage memory devices 104-1, 104-2, . . . 104-N (referred to herein as storage memory devices 104) and management memory device 105, memory controller 110 with data integrity (DI) manager 112, and memory line 106 with data blocks 108-1, 108-2, . . . 108-N (referred to herein as data blocks 108), where N is any suitable integer. In various embodiments, memory module 102 may include multiple management memory devices 105. In one or more embodiments, DI manager 112 may provide data integrity violation detection for data stored in memory module 102, such as by decrypting and performing entropy tests or pattern analysis on one or more decrypted versions of a data object in management memory device 105.

In many embodiments, DI manager 112 may also, or alternatively, provide cryptographically-secure memory encryption and integrity for data stored in memory module 102. In various embodiments described herein, DI manager 112 may provide, via a management memory device (e.g., management memory device 105), one or more of data integrity violation detection for data stored in multiple storage memory devices 104 of memory module 102. In some embodiments, DI manager 112 may be able to implicitly detect data integrity violations occurring in a data block or metadata block in a storage memory device 104 or a management memory device 105.

Memory line 106 may represent data to be stored in memory module 102. In various examples, memory line 106 may include a cache line that has been evicted from a processor cache (e.g., of a host device) that is to be stored in memory module 102 or a cache line that is to be loaded/retrieved from a memory (e.g., memory module 102) and placed into the processor cache. In some embodiments, data blocks 108-1, 108-2, . . . 108-N may each represent a distinct portion of the memory line 106, such as a memory row. In various embodiments, data representing each of data blocks 108 may be stored in corresponding storage memory devices 104-1, 104-2, . . . 104-N. For example, data representing data block 108-1 may be stored in storage memory device 104-1, data representing data block 108-2 may be stored in storage memory device 104-2, and so on. In one example, DI manager 112 may perform a bit encoding operation on data block 108-1 and store the result in storage memory device 104-1, then (or simultaneously) perform a bit encoding operation on data block 108-2 and store the result in storage memory device 104-2, and so on for each data block of memory line 106. Thus, in some embodiments, the number of data blocks 108 of a memory line 106 may equal the number of storage memory devices 104 in memory module 102.

In some embodiments, DI manager 112 may store metadata associated with memory lines in management memory device 105 to enable one or more of error detection, location, correction, encryption, and integrity for data stored in memory module 102. In many such embodiments, at least a portion of the data stored in management memory device 105 is generated based on data of memory line 106. In some embodiments, metadata blocks associated with memory lines are stored based on the storage location of data blocks representing the memory lines. For example, if data blocks representing a particular memory line are stored in respective first physical rows of storage memory devices 104, a corresponding metadata block is stored in the first physical row of management memory device 105; if data blocks representing another memory line are stored in respective second physical rows of storage memory devices 104, a corresponding metadata block is stored in the second physical row of management memory device 105, and so on. Other embodiments may include different storage schemas.

In various embodiments, memory module 102 may comprise computer memory that includes a plurality of memory chips that can be represented by storage memory devices 104 and management memory device 105. For example, management memory device 105 may be a first memory chip, storage memory device 104-1 may be a second memory chip, storage memory device 104-2 may be a third memory chip, and so on. In one example, memory module 102 may include a DIMM with a set of memory chips. In some embodiments, multiple memory modules 102 (e.g., DIMMs) may be included in a computer system. In some such embodiments, the collection of memory modules 102 in a computer may be referred to as or included within the external memory of the computer (e.g., random access memory (RAM)). Some embodiments may include a cache hierarchy where the DI manager 112 may be positioned at any level in the cache hierarchy, such as between the processor and L1 cache, between the L1 and L2 caches, before or after the last level cache, and so on.

In various embodiments, storage memory devices 104 and management memory device 105 of memory module 102 may include one or more of ECC memory, DDR memory, hard drive storage, redundant array of independent disks (RAID) storage, flash memory, nonvolatile memory, 3D crosspoint memory, and the like. In some embodiments, each storage memory device 104 and management memory device 105 in memory module 102 may be the same or similar. For example, each device may comprise the same amount(s) of the same type(s) of memory. As another example, each device may comprise the same form factor (e.g., physical dimensions, electrical connector pinout, etc. In such embodiments, distinctions between storage memory devices 104 and management memory device 105 may reside in the purpose they are used for. Therefore, in some such embodiments, whether a memory device is used as a management memory device 105 or a storage memory device 104 may be arbitrary and/or selectable.

From a redundancy perspective, the distinctions between the memory devices may be physical boundaries that represent the probable extent of a physical failure. For instance, one physical chip or its associated wiring may fail, while the other physical chips or their associated wiring may remain operational. In other embodiments, the physical boundaries may be defined within the physical device, such as a physical row, column, bank, or other adjacency of memory circuits. For example, in a RAID system, each storage memory device 104 may be a distinct hard drive and management memory device 105 may be a separate hard drive used to correct one or more failing hard drives.

Memory controller 110 may include DI manager 112 as well as other circuitry (e.g., circuitry for communicating with memory module 102). DI manager 112 may include bit encoder/decoder 114, pointer tag version generator 116, integrity verifier 118, and any other suitable circuitry. In some embodiments, DI manager 112 may implement tagless implicit integrity with multi-perspective pattern search, such as via one or more of bit encoder/decoder 114, pointer tag version generator 116, and integrity verifier 118. In one or more embodiments, DI manager 112 may utilize bit encoder/decoder 114, pointer tag version generator 116, and integrity verifier 118 to provide tagless implicit integrity with multi-perspective pattern search for data stored in memory module 102. DI manager 112 may utilize management memory device 105 to store data used to enable the data integrity violation detection using tagless implicit integrity with multi-perspective pattern search as described herein. For example, data generated by one or more of bit encoder/decoder 114, pointer tag version generator 116, and/or integrity verifier 118 may be stored in management memory device 105. For example, data such as data integrity test results and metadata, may be generated and stored in management memory device 105 or separate on-chip memory to facilitate detection of and/or correction of data integrity violations, as well as to facilitate integrity verification of corrected data errors, present in data stored in one or more storage memory devices 104.

In various embodiments, the DI manager 112 is able to provide data integrity violation detection using tagless implicit integrity with multi-perspective pattern search for the storage memory devices 104, at least in part by performing various logical operations on data blocks 108 utilizing components of DI manager 112, such as bit encoder/decoder 114, pointer tag version generator 116, and/or integrity verifier 118. In various embodiments, DI manager 112 may implement one or more of these features for data to be stored by a group of storage memory devices 104 via a single management memory device (e.g., management memory device 105).

Figure 2:
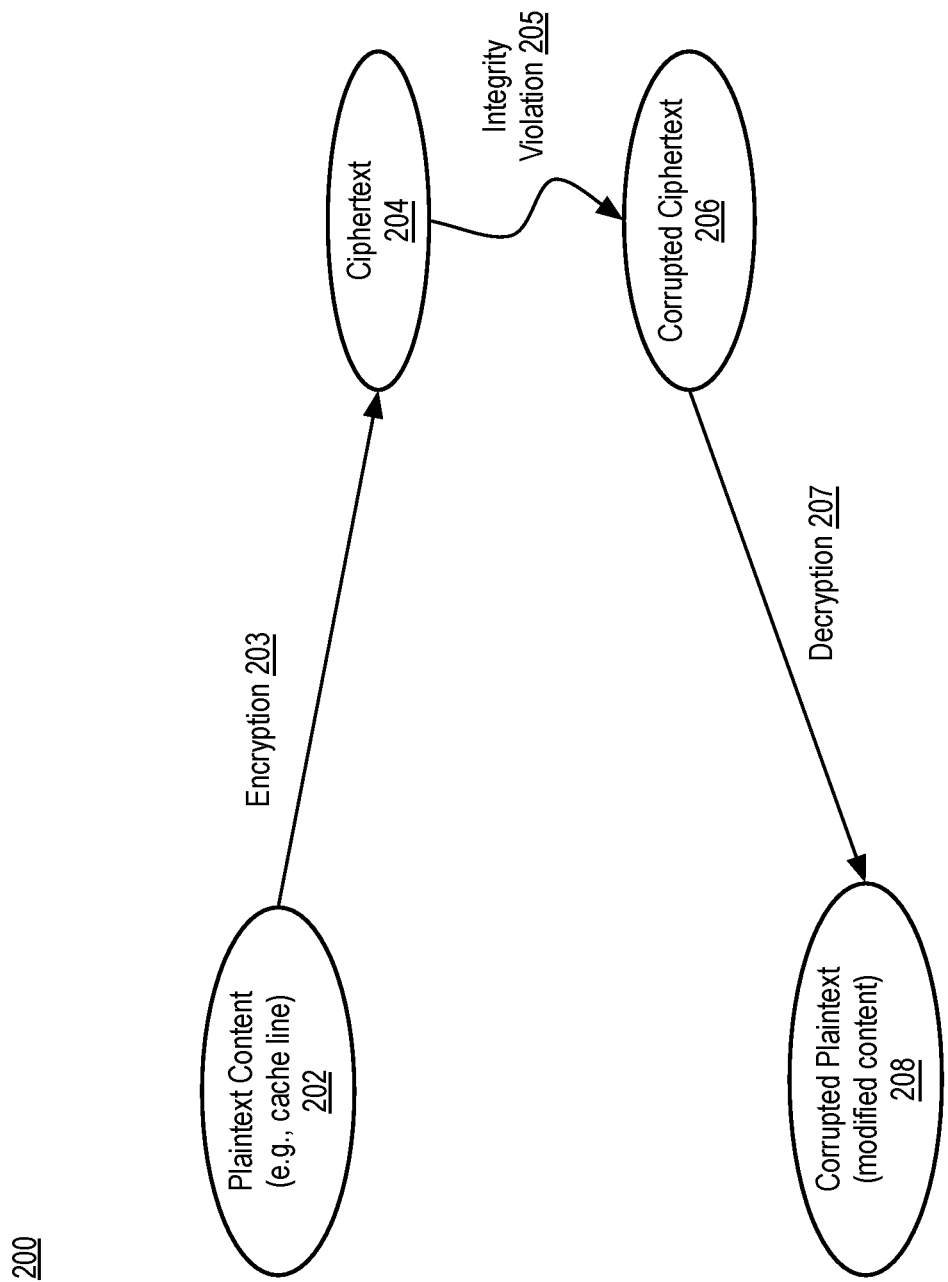
FIG. 2 is a schematic diagram detailing an example data integrity violations occurring in encrypted data, in accordance with implementations herein.

FIG. 2 is a schematic diagram 200 detailing an example data integrity violations occurring in encrypted data, in accordance with implementations herein. In the example shown, some plaintext content 202 exists. The plaintext content 202 may include any suitable type of data, such as, for example, a cache line or other type of data that may be used within a processor. If the plaintext content 202 has patterns (i.e., has low entropy), then such content can be distinguished from random data. When the plaintext content 202 is encrypted 203 (where the encryption algorithm approximates a random oracle), a ciphertext 204 is produced, which is no longer distinguishable from random data. Any integrity violation 205 on the ciphertext 204, for example, using the wrong key or tweak, results in a corrupted ciphertext 206, which is different from the original ciphertext 204. Any subsequent decryption 207 operation on the corrupted ciphertext 206 will result in a corrupted plaintext value 208 that is different from the original plaintext content 202.

As decryption is the inverse operation of encryption, the decryption algorithm also approximates a random oracle. Because of this, the corrupted plaintext 208 is also indistinguishable from random data. Furthermore, the corrupted plaintext 208 is indistinguishable from random data due to an 'avalanche effect' associated with the decryption oracle. Even a single bit change in the ciphertext 204 affects all bits of the decrypted plaintext (e.g., 208). For these reasons, checking the entropy of the result of a decryption operation can be a reliable test for detecting data integrity violations. This methodology may be referred to as implicit integrity. Similarly, a random pad or calculated stream from a stream cipher can be combined with a data line to produce a random ciphertext. Removing the pad or stream using a reversible function (for example and XOR operation) can return the data to its original form. The stream cipher output or random pad to be used may be selected using the tag value in a pointer (virtual/linear address) used to access the memory.

In the context of cryptographic computing, implicit integrity may be particularly important because memory load and store operations encrypt the data just before exiting the CPU core, and before entering the Level-1 (L1) cache (or other part of the memory hierarchy), and similarly decrypt data as they enter the CPU core. Implicit integrity allows the CPU core to seamlessly detect data integrity violations on the data by performing a decryption operation and checking the entropy of the decrypted content. This is a low-cost operation, incurring nowhere near the cost of the MAC approach described above.

Referring back to FIG. 1, DI manager 112 implements data integrity violation detection using tagless implicit integrity with multi-perspective pattern search, in accordance with implementations herein. In one implementation, implicit integrity is achieved by identifying patterns in decrypted data to determine if the correct key or tweak was used to decrypt the data. For example, the CPU may use a variety of tag values to tweak the data decryption to determine if the current pointer tag or another tag value was used to encrypt the original data. Patterns may be detected in data as a run of zeros or ones, repeated bytes, or a run of standard characters or symbols corresponding to the ASCII format, floating point formats, integer formats, code, Unicode, etc. These patterns can also occur on the expected byte boundaries or other expected alignments. In some implementations, the occurrence of these repeated patterns can be computed by a threshold from the expected occurrence in a string of random ciphertext bits. This difference in entropy becomes the mechanism for determining whether the data was properly decrypted or (potentially) belonging to another allocation (in the case of use after free). The probability of patterns increases across a larger data region, for example, a cacheline of 64 bytes or larger.

In some implementations, the DI manager 112 can utilize a pointer tag in a pointer used to access memory address in order to encrypt a data object in memory (an allocation). For example, the bit encoder/decoder 114 can utilize a stream cipher, where the version of the pointer (as referred to herein as the pointer version or pointer tag) can act as the initialization vector (IV) and the pointer address is the counter.

Figure 3:
FIG. 3 illustrates an example pointer used for accessing data in memory using tagless implicit integrity with multi-perspective pattern search, in accordance with implementations herein.

In some implementations, a slice of the pointer can be authenticated or encrypted. FIG. 3 illustrates an example pointer 300 used for accessing data in memory using tagless implicit integrity with multi-perspective pattern search, in accordance with implementations herein. The example pointer 300 may include a determined number of bits that are broken into portions of bits including a metadata buffer size 310, encrypted tag 320, encrypted with tweak 330, plaintext tweak 340, and plaintext buffer size 350, for example.

In one implementation, the slice of the pointer 300 can be encrypted using a secret key to produce a range-encoded pointer, where a size field, such as plaintext buffer size 350, can determine the number of address bits to be used as a tweak for the encrypted pointer slice, including the tag value 320, as illustrated in FIG. 3. This makes the encrypted portion of the pointer 300 dependent on the size and location of the data it references. The tag or version 320 may be included in the encrypted portion of the pointer 300 such that the tag should be decrypted. This prevents forgery of pointer tag values by an adversary. Other embodiments may prevent forgery of a pointer by using a Messaged Authentication Code (MAC) truncated to fit within the pointer, using a secret key unknown to an adversary such that tampering with the pointer value or tag would result in an invalid MAC value and causing the processor to generate an exception or other error indication to identify the attempted illegitimate modification of the pointer.

This pointer 300 can then be used by the processor to encrypt a data object in memory by using the pointer 300 as a tweak, or IV, to the data encryption stream cipher and a secret key. When loading the data object, the stream cipher (or similarly block cipher using the immutable pointer bits as a tweak), can be used to decrypt the data object using a secret key.

Referring back to FIG. 1, the DI manager 112 can use the bit encoder/decoder 114, pointer tag version generator 116, and integrity verifier 118 to implement tagless implicit integrity to identify repeated bytes in a decrypted cacheline using an encoded pointer, such as example pointer 300. After a cache line has been decrypted by bit encoder/decoder 114, the integrity verifier 118 determines whether patterns exist in the decrypted data line. In one implementation, the integrity verifier 118 performs an entropy test or pattern test to determine whether patterns exist in the decrypted data. For example, the entropy test may include determining a number of data entities in the decrypted data whose values are equal to one another, determining a number of adjacent data entities in the decrypted data whose values are equal to one another, determining a number of data entities in the decrypted data whose values are equal to at least one special value from a set of special values, or determining a sum of n highest data entity value frequencies. The entropy test may check for one or more patterns in the decrypted data and decide as to whether the decrypted data is of low entropy as defined by a threshold. For example, in one implementation, the integrity verifier 118 may check whether there are 4 or more 16-bit words that are equal to each other (e.g., among a set of 32 words). Alternatively, the integrity verifier may check whether there are 8 bytes that are the same value for the 64 bytes on a cacheline. Other example pattern checks or combinations of pattern checks are also possible in implementations herein.

If integrity verifier 118 determines that there is a pattern in the decrypted data, then it assumes that the pointer used to access the decrypted data was the correct one and there is no exploit. If, however, no patterns emerge, implementations provide for two possibilities: (1) there is a possible exploit, or (2) the data is, in fact, random (or random looking in that no patterns emerge). The second option is referred to as a false negative (due to random data). Some implementations may choose to lookup a memory tag (e.g., from a memory table) in the case that no clear patterns emerge from the data to verify if this pointer tag used to access the memory granule matches the tag value stored in memory for the accessed data granule.

In some implementations herein, to address the potential false negative due to random data scenario, the DI manager 112 can attempt to change or update the version of the tag in the pointer to determine if another version of the pointer tag was used to encrypt the data and repeat the decryption process again. The pointer tag version generator 116 can update the pointer tag version. In some implementations, the pointer tag version is incremented according to a determined understanding of how the pointers are freed and re-allocated by the system 100. For example, the memory allocator may select sequential versions for each subsequent memory allocation after the memory is freed. The pointer tag version may be incremented by one or by any other determined interval. In some implementations, the pointer tag version is randomly updated to any possible version number of the pointer tag. In this case, the DI manager 112 may verify all possible versions of the tag value and decrypt the data using each version in kind searching for patterns in the decrypted data for each version.

The bit encoder/decoder 114 then utilize the updated pointer tag version number to re-decrypt the encrypted data object (for example, using the version number as a cryptographic tweak) and the integrity verifier 118 test for patterns in the re-decrypted data object. If no patterns emerge, additional versions can be tested in the same way. In some implementations, the additional versions are tested up to a threshold number of versions. In some implementations, the threshold number of versions is determined by the system 100 and can be based on computing resources of the system. In some implementations, the threshold number of versions is the same as a number of possible versions of the pointer tag. Hardware may test multiple or all versions, decrypting the data and analyzing the decrypted data for patterns, in parallel to improve performance.

If none of the tried pointer versions indicate that there are patterns in the decrypted data, the integrity verifier 118 concludes that the original decrypted data was in fact random and there is no data integrity violation (e.g., exploit, etc.). In this case, the original instruction may continue executing (e.g., load instruction to access data) without a data integrity violation being detected.

If, however, one of the subsequent versions that are tested reveals that another pointer produces patterned data upon decryption, it may be determined that a data integrity violation did occur. In some implementations, the data integrity violation is a use after free (UAF) exploit where a freed pointer is being used to access reallocated data.

In some implementations, the data integrity violation is a buffer overflow condition. In the case of a buffer overflow, adjacent allocations of a buffer may have a determined pattern of bits (e.g., a special random pattern of bits) padded at the end (or beginning) of each buffer to signify the buffer boundary. When data of a buffer is encrypted and/or decrypted, a buffer size (or location) value can be used to encrypt/decrypt the buffer data, along with the tag version, in order to differentiate between adjacent buffers that may reside on the same cache line. The integrity verifier 118 can test for patterns in the decrypted data of a buffer by specifically looking for the determined pattern of bits used to signify the buffer boundary. When testing over an entire cache line, this can reveal when a buffer has overflowed, and/or reveals the patterns in adjacent buffers that should not have patterns existing in their data.

Responsive to the integrity verifier 118 determining that a data integrity violation occurred, the integrity verifier may cause an exception (or other error) to be signaled by the processor to alert software of the potential compromise. In some implementations, a software memory allocation handler may then take additional steps to determine if the exception is a false positive by, for example, checking metadata related to the allocation. In some embodiments, the hardware may lookup a tag (e.g., in a memory table of tags) for the access memory granule if a data integrity violation occurs, and then trigger an exception to software if the pointer tag and memory tag for the accessed granule of memory do not match.

Given a set of at least three tag values, it is possible to assign different tag values across a boundary between any two adjacent allocations. That is the case even if tag values for existing allocations should be preserved while reallocating adjacent memory regions. A possible procedure for selecting tag values for new allocations is further discussed below.

Tags for spatial separation may be represented in a separate pointer field from a tag or version for temporal separation, or a unified tag field may be used for both purposes. In that case, additional values may be utilized beyond three to avoid quickly reusing a given tag value for a given location in memory. Using a separate adjacency tag field allows tags for versions of the same memory location with the same adjacency tag value to be tested independently of tags for adjacent buffers as indicated by the different adjacency tags for the adjacent buffers. In this way adjacent buffers are encrypted differently than the buffers they are adjacent to, which allows different pattern tests to be conducted for adjacencies.

Adjacency pattern tests may look for paddings at the beginning or end of the adjacent buffer to determine if the original pointer overran or underran the extent of its buffer and entered an adjacent buffer whose data decryption demonstrates the padding pattern is present. Padding may be inserted into a memory allocation by the memory allocator. In one implementation, padding may be a run of a special random pattern of bits (unlikely to occur naturally in data), zeros (for example, 4 contiguous bytes of zero or other special value), and so on, representing a pattern that the adjacency is present. This pattern can indicate the beginning of a buffer such that any accesses to or past this specific pattern from another adjacency tag can trigger an exception or other error. All version tags of each adjacency tag may be used to decrypt the cacheline in turn to determine if the adjacency is present on the cacheline. Cachelines that exhibit patterns for a version of an adjacent tag value without the beginning of buffer specific pattern may then indicate that the memory access is past the buffer's starting location but somewhere in the middle, and again cause the processor to trigger an exception or other error notification to software.

Instantaneous Critical Security Invariant: No adjacent memory regions are assigned the same tag value.

Continuous Critical Security Invariant: The Instantaneous Critical Security Invariant holds at every instant in time, i.e., no adjacent memory regions are ever assigned the same tag value given an arbitrary sequence of memory region updates (i.e., allocations or deallocations).

Definition 1: A "memory region" is a contiguous range of memory assigned a single tag value, i.e., an active allocation, a previous allocation that is now freed, or memory that has not previously been allocated. All memory regions occupy a finite, contiguous, bounded range of linear addresses (e.g., as defined by the supported linear address width).

Definition 2: Both cases that will be described in the proof of the Instantaneous Critical Security Invariant fit a common template: The initial configuration is a sequence of three adjacent memory regions satisfying the Non-temporal Critical Security Invariant. The goal is to change the tag value of one or more bytes in the middle memory region without changing the tag values assigned to the surrounding allocations. Let distinct upper-case characters symbolically represent distinct tag values. A string of upper-case characters represents adjacent memory regions (i.e., adjacent characters represent adjacent memory regions) of unspecified size with the specified tag values.

Lemma 1: An arbitrary number of memory region updates can be expressed in terms of a series of operations introducing at most one new memory region boundary and assigning a new tag value to a single memory region.

Proof of Lemma 1: Proof by Induction:

Base case 1 (0 new boundaries): The entire middle memory region from Definition 3 is assigned a new tag value.

Base case 2 (1 new boundary): A single boundary is inserted into the middle memory region from Definition 3, and either the new memory region above the boundary or below the boundary is assigned a new tag value while the other new memory region retains its original tag value.

Inductive case (n+1 new boundaries): n+1 new boundaries are inserted into the middle memory region from Definition 3.

Proof: The new boundary with the lowest address is inserted into the middle memory region from Definition 3, forming new lower and upper memory regions within that. By induction, we can then proceed with the remaining n boundaries relative to the new upper memory region. QED.

Proof of Temporal Critical Security Invariant: Proof by Cases:

Case 1: Change an initial configuration of ABBA (formatted as described in Definition 3, representing identical tag values bookending a memory region with a different tag value) to a different configuration that introduces one new memory region boundary.

ABBA can be changed to ACBA, ABCA, depending on whether the lower or upper portion of the middle memory region that originally had the tag value B should be assigned a new tag value. None of these tag value updates would violate the Instantaneous Critical Security Invariant.

Case 2: Change an initial configuration of ABBC to a different configuration that introduces one new memory region boundary.

ABBC can be changed to ACBC or ABAC. None of these tag value updates would violate the Instantaneous Critical Security Invariant.

Case 3: Change an initial configuration to a different configuration that introduces more than one new memory region boundary.

This can be reduced to a series of reconfigurations with each one conforming to the first two cases according to Lemma 1.

QED.

Note that tag value symbols A, B, and C were utilized, showing that any sequence of reallocations can be handled when at least three tag values are available.

In some embodiments, the DI manager may test all possible tag values (by decrypting the data for each tag tweak and then testing for patterns) and send back to the processor (for example, in metadata associated with the cacheline) the tag value or tag values that demonstrated patterns in the data. The processor may use this metadata to compare with the pointer value used to access the data to determine if there was a probable memory integrity failure in response to the reported metadata tag value not matching the tag value in the pointer used to access the cacheline. Such embodiments may allow the memory to be examined for patterns without the DI manager knowing the accessing tag value in the pointer.

FIG. 4 illustrates an example flow 400 for tagless implicit integrity with multi-perspective pattern search, in accordance with certain embodiments. The various operations of the flow may be performed by any suitable circuitry, such as a processor or processing unit of a computing device, a controller of a computing device, a controller of a memory module, or other components of a computing device. The example flow 400 may be representative of some or all the operations that may be executed by or implemented on one or more components of system 100 of FIG. 1, such as data integrity (DI) manager 112. The embodiments are not limited in this context.

At block 410, the processor may access encrypted data stored in a memory hierarchy using a pointer. Then, at block 420, the processor may decrypt the encrypted data using a current version of a pointer tag of the pointer to yield first decrypted data. At block 430, the processor may perform an entropy test on the first decrypted data.

Subsequently, at block 440, the processor may, responsive to the entropy test failing to detect patterns in the decrypted data, decrypt the encrypted data using one or more different versions of the pointer tag of the pointer to yield one or more other decrypted data. At block 450, the processor may perform the entropy test on the one or more other decrypted data. Lastly, at block 460, the processor may signal, responsive to the entropy test detecting the patterns in the one or more other decrypted data, an exception to the processor with respect to the encrypted data.

Figure 5:
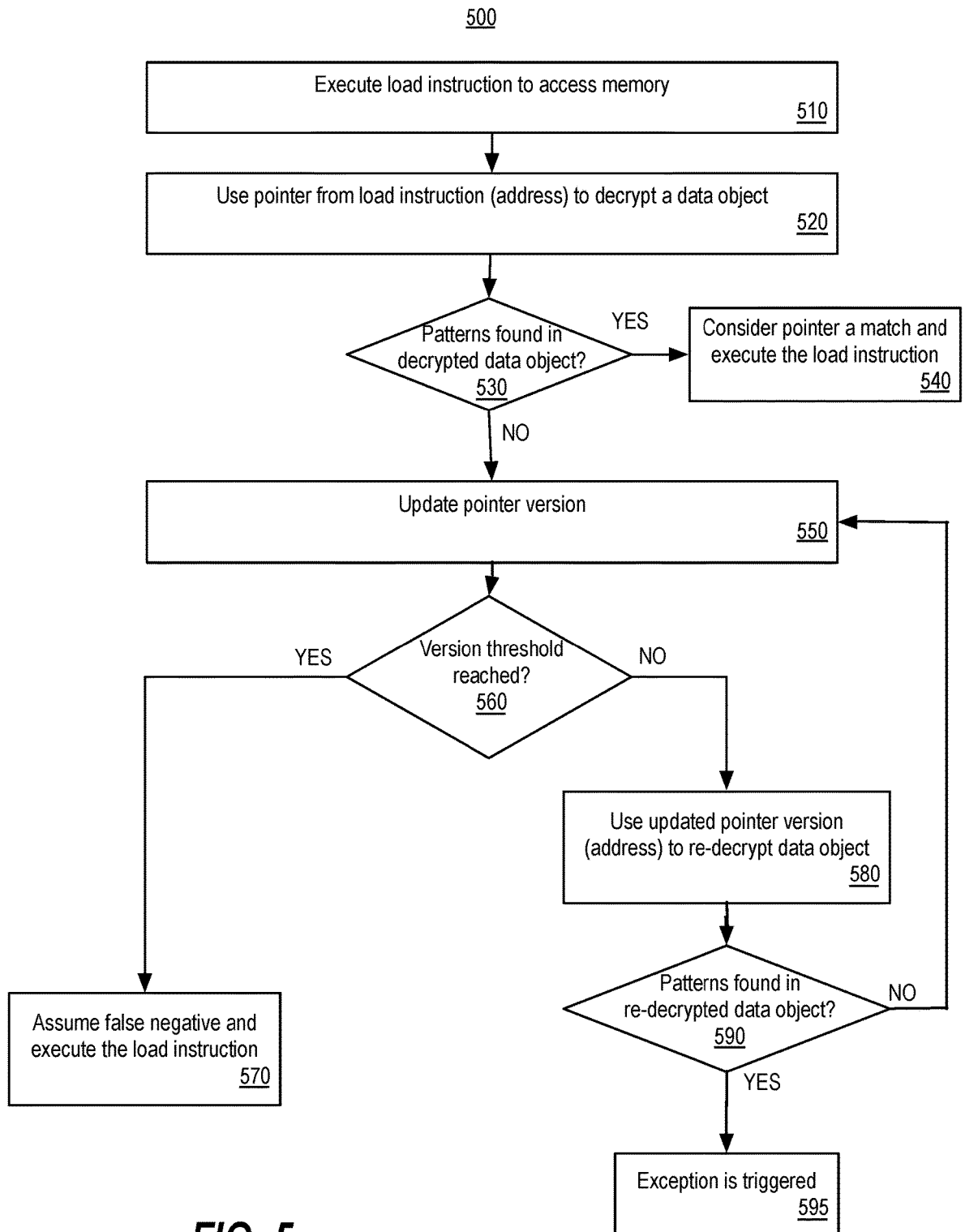
FIG. 5 illustrates an example flow for tagless implicit integrity with multi-perspective pattern search using a version threshold assessment, in accordance with certain embodiments

FIG. 5 illustrates an example flow 500 for tagless implicit integrity with multi-perspective pattern search using a version threshold assessment, in accordance with certain embodiments. The various operations of the flow may be performed by any suitable circuitry, such as a processor or processing unit of a computing device, a controller of a computing device, a controller of a memory module, or other components of a computing device. The example flow 500 may be representative of some or all the operations that may be executed by or implemented on one or more components of system 100 of FIG. 1, such as data integrity (DI) manager 112. The embodiments are not limited in this context.

At block 510, the processor may execute a load instruction to access memory. Then, at block 520, the processor may use a pointer from the load instruction (e.g., an address) to decrypt a data object. At decision block 530, the processor may determine whether there are patterns found in decrypted data object. In one implementation, the processor may utilize an entropy test to determine whether there are patterns in the decrypted data object.

If patterns are found in the decrypted data object, the flow 500 proceeds to block 540, where the processor may consider the pointer to be a match and execute the load instruction. However, if no patterns are found in the decrypted data object, flow 500 proceeds to block 550, where the processor may update a pointer version of the pointer. In one implementations, the pointer version is also referred to as the pointer tag. In one implementation, updating the pointer version include incrementing the pointer version.

At decision block 560, the processor determines whether a version threshold is reached. In one implementation, the version threshold is a number of different pointer versions that are generated and tested. If the version threshold is reached, the flow 500 proceeds to block 570, where the processor may assume that the failure to identify a pattern in the original decrypted object is a false negative and executes the load instruction.

On the other hand, if the version threshold is not yet reached at decision block 560, then flow 500 proceeds to block 580, where the processor may use an updated pointer version (e.g., address) to re-decrypt data object. Then, at decision block 590, the processor may determine whether patterns are found in the re-decrypted data object? If so, flow 500 proceeds to block 595, where an exception is triggered to the processor. In one implementation, the exception can include a use-after-free (UAF) exception indicating possible detection of a UAF exploit on the data. On the other hand, if patterns are not detected in the re-decrypted data object at decision block 590, the flow 500 returns to block 550 where the pointer version is updated and flow 500 continues as discussed above.

FIG. 6 illustrates an example flow 600 for tagless implicit integrity with multi-perspective pattern search to detect a boundary overflow, in accordance with certain embodiments. The various operations of the flow may be performed by any suitable circuitry, such as a processor or processing unit of a computing device, a controller of a computing device, a controller of a memory module, or other components of a computing device. The example flow 600 may be representative of some or all the operations that may be executed by or implemented on one or more components of system 100 of FIG. 1, such as data integrity (DI) manager 112. The embodiments are not limited in this context.

At block 610, the processor access encrypted data stored in a buffer data structure using a pointer. At block 620, the processor may decrypt the encrypted data using a current version of a pointer tag of the pointer and buffer size to yield first decrypted data. Then, at block 630, the processor may perform an entropy test on the first decrypted data.

Subsequently, at block 640, the processor may, responsive to the entropy test failing to detect patterns in the decrypted data used to delineate the buffer data structure from an adjacent buffer data structure, decrypt the encrypted data using one or more different versions of the pointer tag of the pointer and buffer size to yield one or more other decrypted data. Then, at block 650, the processor may perform the entropy test on the one or more other decrypted data. Lastly, at block 660, the processor may, responsive to the entropy test detecting the patterns in the one or more other decrypted data, signal an exception to the processor indicating a buffer overflow into the adjacent buffer data structure.

Figure 7:
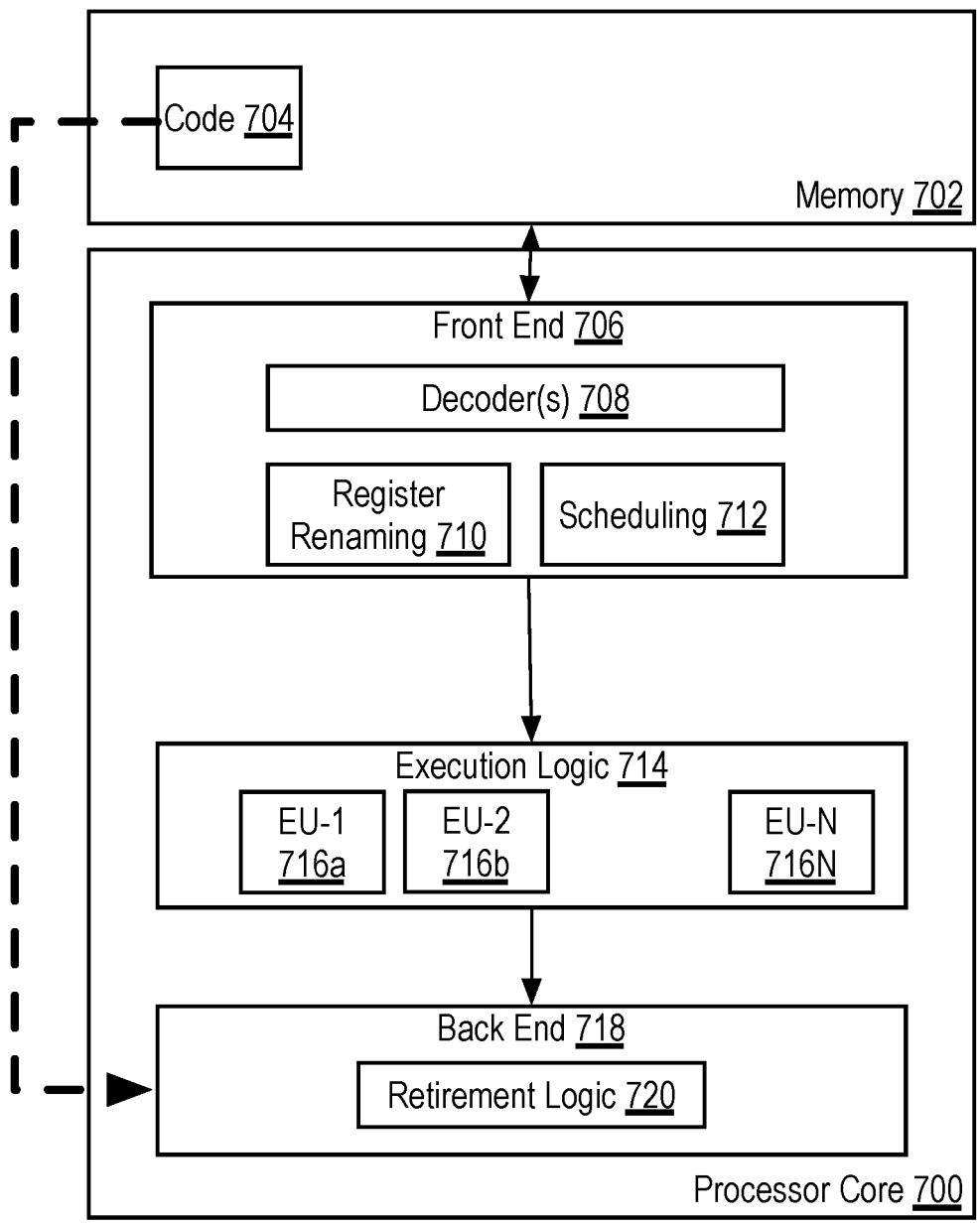
FIG. 7 is a block diagram illustrating an example processor core and memory according to at least one embodiment.
Figure 8:
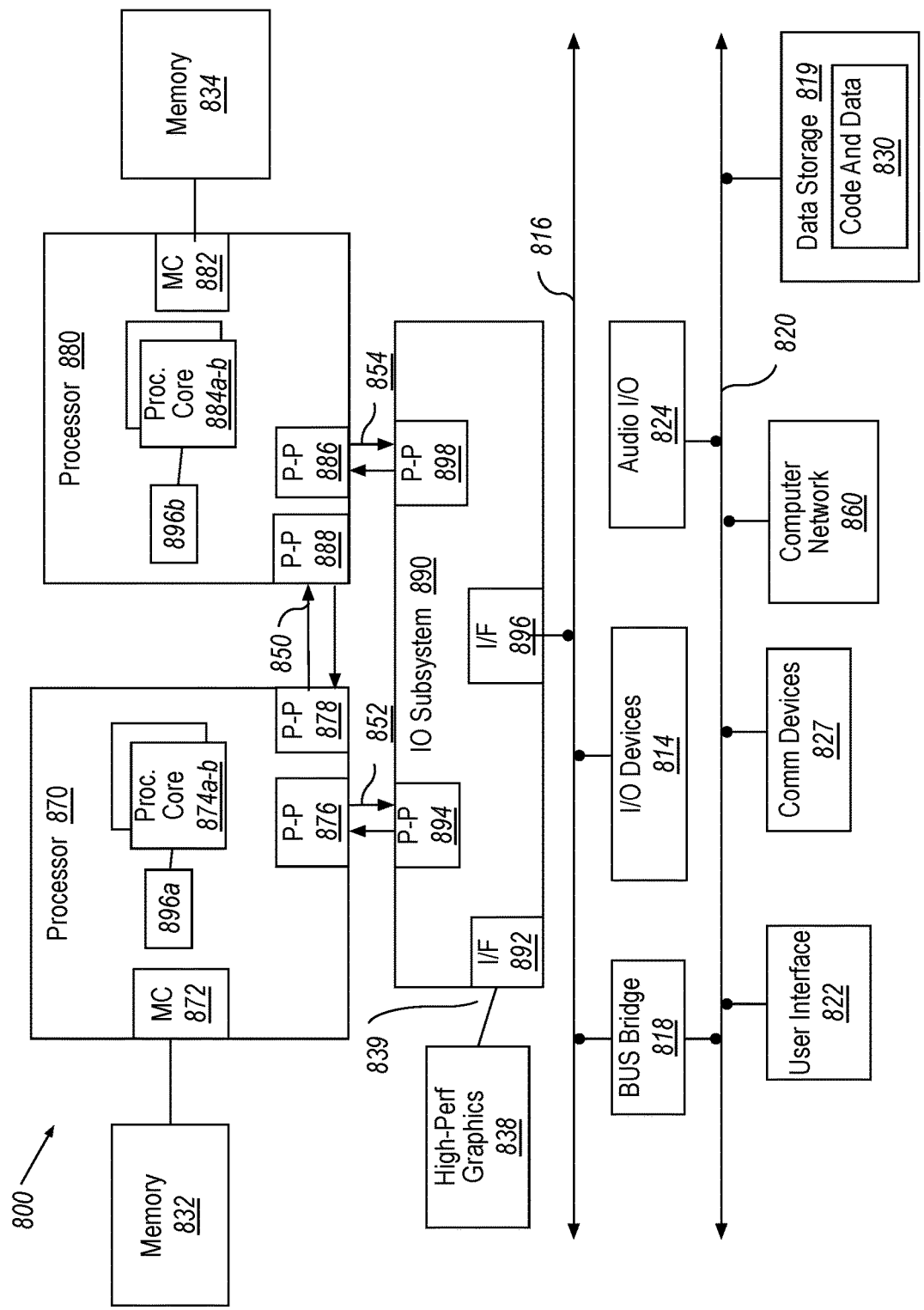
FIG. 8 is a block diagram of an example computer architecture according to at least one embodiment.

FIGS. 7-8 are block diagrams of example computer architectures that may be used in accordance with embodiments disclosed herein. Generally, any computer architecture designs known in the art for processors and computing systems may be used. In an example, system designs and configurations known in the arts for laptops, desktops, handheld PCs, personal digital assistants, tablets, engineering workstations, servers, network devices, servers, appliances, network hubs, routers, switches, embedded processors, digital signal processors (DSPs), graphics devices, video game devices, set-top boxes, micro controllers, smart phones, mobile devices, wearable electronic devices, portable media players, hand held devices, and various other electronic devices, are also suitable for embodiments of computing systems described herein. Generally, suitable computer architectures for embodiments disclosed herein can include, but are not limited to, configurations illustrated in FIGS. 7-8.

FIG. 7 is an example illustration of a processor according to an embodiment. Processor 700 is an example of a type of hardware device that can be used in connection with the implementations above. For example, processor 700 may part of system 100 implementing tagless implicit integrity with multi-perspective pattern search, in accordance with implementations of the disclosure. Processor 700 may be any type of processor, such as a microprocessor, an embedded processor, a digital signal processor (DSP), a network processor, a multi-core processor, a single core processor, or other device to execute code. Although only one processor 700 is illustrated in FIG. 7, a processing element may alternatively include more than one of processor 700 illustrated in FIG. 7. Processor 700 may be a single-threaded core or, for at least one embodiment, the processor 700 may be multi-threaded in that it may include more than one hardware thread context (or "logical processor") per core.

FIG. 7 also illustrates a memory 702 coupled to processor 700 in accordance with an embodiment. Memory 702 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 700 can execute any type of instructions associated with algorithms, processes, or operations detailed herein. Generally, processor 700 can transform an element or an article (e.g., data) from one state or thing to another state or thing.

Code 704, which may be one or more instructions to be executed by processor 700, may be stored in memory 702, or may be stored in software, hardware, firmware, or any suitable combination thereof, or in any other internal or external component, device, element, or object where appropriate and based on particular uses. In one example, processor 700 can follow a program sequence of instructions indicated by code 704. Each instruction enters a front end logic 706 and is processed by one or more decoders 708. The decoder may generate, as its output, a micro operation such as a fixed width micro operation in a predefined format, or may generate other instructions, microinstructions, or control signals that reflect the original code instruction. Front end logic 706 also includes register renaming logic 710 and scheduling logic 712, which generally allocate resources and queue the operation corresponding to the instruction for execution.

Processor 700 can also include execution logic 714 having a set of execution units 716a, 716b, 716N, etc. Some embodiments may include a number of execution units dedicated to specific functions or sets of functions. Other embodiments may include only one execution unit or one execution unit that can perform a particular function. Execution logic 714 performs the operations specified by code instructions.

After completion of execution of the operations specified by the code instructions, back-end logic 718 can retire the instructions of code 704. In one embodiment, processor 700 allows out of order execution but utilizes in order retirement of instructions. Retirement logic 720 may take a variety of known forms (e.g., re-order buffers or the like). In this manner, processor 700 is transformed during execution of code 704, at least in terms of the output generated by the decoder, hardware registers and tables utilized by register renaming logic 710, and any registers (not shown) modified by execution logic 714.

Although not shown in FIG. 7, a processing element may include other elements on a chip with processor 700. For example, a processing element may include memory control logic along with processor 700. The processing element may include I/O control logic and/or may include I/O control logic integrated with memory control logic. The processing element may also include one or more caches. In some embodiments, non-volatile memory (such as flash memory or fuses) may also be included on the chip with processor 700.

FIG. 8 illustrates a computing system 800 that is arranged in a point-to-point (PtP) configuration according to an embodiment. In particular, FIG. 8 shows a system where processors, memory, and input/output devices are interconnected by a number of point-to-point interfaces. Generally, one or more of the computing systems or computing devices described herein may be configured in the same or similar manner as computing system 800. For example, computing system 800 may be the same as system 100 implementing collision-free hashing for accessing cryptographic computing metadata and for cache expansion in accordance with implementations of the disclosure.

Processors 870 and 880 may be implemented as single core processors 874a and 884a or multi-core processors 874a-874b and 884a-884b. Processors 870 and 880 may each include a cache 896a and 896b used by their respective core or cores. A shared cache (not shown) may be included in either processors or outside of both processors, yet connected with the processors via P-P interconnect, such that either or both processors' local cache information may be stored in the shared cache if a processor is placed into a low power mode.

Processors 870 and 880 may also each include integrated memory controller logic (MC) 872 and 882 to communicate with memory elements 832 and 834, which may be portions of main memory locally attached to the respective processors. In alternative embodiments, memory controller logic 872 and 882 may be discrete logic separate from processors 870 and 880. Memory elements 832 and/or 834 may store various data to be used by processors 870 and 880 in achieving operations and functionality outlined herein.

Processors 870 and 880 may be any type of processor, such as those discussed in connection with other figures. Processors 870 and 880 may exchange data via a point-to-point (PtP) interface 850 using point-to-point interface circuits 878 and 888, respectively. Processors 870 and 880 may each exchange data with an input/output (I/O) subsystem 890 via individual point-to-point interfaces 852 and 854 using point-to-point interface circuits 876, 886, 894, and 898. I/O subsystem 890 may also exchange data with a high-performance graphics circuit 838 via a high-performance graphics interface 839, using an interface circuit 892, which could be a PtP interface circuit. In one embodiment, the high-performance graphics circuit 838 is a special-purpose processor, such as, for example, a high-throughput MIC processor, a network or communication processor, a compression engine, graphics processor, GPGPU, embedded processor, or the like. I/O subsystem 890 may also communicate with a display for displaying data that is viewable by a human user. In alternative embodiments, any or all of the PtP links illustrated in FIG. 8 could be implemented as a multi-drop bus rather than a PtP link.

I/O subsystem 890 may be in communication with a bus 816 via an interface circuit 896. Bus 816 may have one or more devices that communicate over it, such as a bus bridge 818 and I/O devices 814. Via a bus 820, bus bridge 818 may be in communication with other devices such as a user interface 822 (such as a keyboard, mouse, touchscreen, or other input devices), communication devices 827 (such as modems, network interface devices, or other types of communication devices that may communicate through a computer network 860), audio I/O devices 824, and/or a data storage device 819. Data storage device 819 may store code and data 830, which may be executed by processors 870 and/or 880. In alternative embodiments, any portions of the bus architectures could be implemented with one or more PtP links.

The computer system depicted in FIG. 8 is a schematic illustration of an embodiment of a computing system that may be utilized to implement various embodiments discussed herein. It can be appreciated that various components of the system depicted in FIG. 8 may be combined in a system-on-a-chip (SoC) architecture or in any other suitable configuration capable of achieving the functionality and features of examples and implementations provided herein.

The following examples pertain to further embodiments. Example 1 is an apparatus to facilitate tagless implicit integrity with multi-perspective pattern search. The apparatus of Example 1 comprises one or more processors comprising hardware circuitry to: access encrypted data stored in a memory hierarchy using a pointer; decrypt the encrypted data using a current version of a pointer tag of the pointer to yield first decrypted data; perform an entropy test on the first decrypted data; responsive to the entropy test failing to detect patterns in the first decrypted data, re-decrypt the encrypted data using one or more different versions of the pointer tag of the pointer to yield one or more other decrypted data; perform the entropy test on the one or more other decrypted versions; and responsive to the entropy test detecting the patterns in the one or more other decrypted data, signal an exception to the one or more processors with respect to the encrypted data.

In Example 2, the subject matter of Example 1 can optionally include wherein a number of the one or more different versions is determined in accordance with a threshold number of versions. In Example 3, the subject matter of any one of Examples 1-2 can optionally include wherein the exception is a use-after-free exception. In Example 4, the subject matter of any one of Examples 1-3 can optionally include wherein the patterns comprise at least one of repeated bytes, repeated nibbles, repeated words, a run of zeros, a run of ones, a run of a combinations of zeros and ones, or a run of standard characters or standard symbols.

In Example 5, the subject matter of any one of Examples 1-4 can optionally include wherein the different versions comprise sequential versions originating from the current version. In Example 6, the subject matter of any one of Examples 1-5 can optionally include wherein the different versions comprise all possible versions of the pointer tag. In Example 7, the subject matter of any one of Examples 1-6 can optionally include wherein the hardware circuitry is further to, responsive to the entropy test failing to detect the patterns in the one or more other decrypted data, execute an instruction to load the first decrypted data.

In Example 8, the subject matter of any one of Examples 1-7 can optionally include wherein the hardware circuitry is further to, responsive to the entropy test detecting the patterns in the first decrypted data, execute an instruction to load the first decrypted data. In Example 9, the subject matter of any one of Examples 1-8 can optionally include wherein the encrypted data is further decrypted using a buffer size, wherein the entropy test is to detect patterns indicating a boundary between two buffers, and wherein the exception is for a boundary overflow.

Example 10 is a method for facilitating tagless implicit integrity with multi-perspective pattern search. The method of Example 10 can include accessing, by a processing device, encrypted data stored in a memory hierarchy using a pointer; decrypting the encrypted data using a current version of a pointer tag of the pointer to yield first decrypted data; performing an entropy test on the first decrypted data; responsive to the entropy test failing to detect patterns in the first decrypted data, re-decrypting the encrypted data using one or more different versions of the pointer tag of the pointer to yield one or more other decrypted data; performing the entropy test on the one or more other decrypted versions; and responsive to the entropy test detecting the patterns in the one or more other decrypted data, signaling an exception with respect to the encrypted data.

In Example 11, the subject matter of Example 10 can optionally include wherein a number of the one or more different versions is determined in accordance with a threshold number of versions. In Example 12, the subject matter of Examples 10-11 can optionally include wherein the patterns comprise at least one of repeated bytes, repeated nibbles, repeated words, a run of zeros, a run of ones, a run of a combinations of zeros and ones, or a run of standard characters or standard symbols. In Example 13, the subject matter of Examples 10-12 can optionally include wherein the different versions comprise sequential versions originating from the current version.

In Example 14, the subject matter of Examples 10-13 can optionally include wherein the different versions comprise all possible versions of the pointer tag. In Example 15, the subject matter of Examples 10-14 can optionally include further comprising responsive to the entropy test failing to detect the patterns in the one or more other decrypted data, executing an instruction to load the first decrypted data. In Example 16, the subject matter of Examples 10-15 can optionally include further comprising responsive to the entropy test detecting the patterns in the first decrypted data, executing an instruction to load the first decrypted data.

Example 17 is a non-transitory computer-readable storage medium for facilitating tagless implicit integrity with multi-perspective pattern search. The non-transitory computer-readable storage medium of Example 17 having stored thereon executable computer program instructions that, when executed by one or more processors, cause the one or more processors to perform operations comprising: accessing, by a processing device, encrypted data stored in a memory hierarchy using a pointer; decrypting the encrypted data using a current version of a pointer tag of the pointer to yield first decrypted data; performing an entropy test on the first decrypted data; responsive to the entropy test failing to detect patterns in the first decrypted data, re-decrypting the encrypted data using one or more different versions of the pointer tag of the pointer to yield one or more other decrypted data; performing the entropy test on the one or more other decrypted versions; and responsive to the entropy test detecting the patterns in the one or more other decrypted data, signaling an exception to the one or more processors with respect to the encrypted data.

In Example 18, the subject matter of Example 17 can optionally include wherein a number of the one or more different versions is determined in accordance with a threshold number of versions. In Example 19, the subject matter of Examples 17-18 can optionally include wherein the patterns comprise at least one of repeated bytes, repeated nibbles, repeated words, a run of zeros, a run of ones, a run of a combinations of zeros and ones, or a run of standard characters or standard symbols. In Example 20, the subject matter of Examples 17-19 can optionally include wherein the operations further comprise: responsive to the entropy test failing to detect the patterns in the one or more other decrypted data, executing an instruction to load the first decrypted data; and responsive to the entropy test detecting the patterns in the first decrypted data, executing an instruction to load the first decrypted data.

Example 21 is a system for facilitating tagless implicit integrity with multi-perspective pattern search. The system of Example 21 can optionally include a memory to store a block of data, and a processor communicably coupled to the memory to: access encrypted data stored in a memory hierarchy using a pointer; decrypt the encrypted data using a current version of a pointer tag of the pointer to yield first decrypted data; perform an entropy test on the first decrypted data; responsive to the entropy test failing to detect patterns in the first decrypted data, re-decrypt the encrypted data using one or more different versions of the pointer tag of the pointer to yield one or more other decrypted data; perform the entropy test on the one or more other decrypted versions; and responsive to the entropy test detecting the patterns in the one or more other decrypted data, signal an exception to the one or more processors with respect to the encrypted data.

In Example 22, the subject matter of Example 21 can optionally include wherein a number of the one or more different versions is determined in accordance with a threshold number of versions. In Example 23, the subject matter of any one of Examples 21-22 can optionally include wherein the exception is a use-after-free exception. In Example 24, the subject matter of any one of Examples 21-23 can optionally include wherein the patterns comprise at least one of repeated bytes, repeated nibbles, repeated words, a run of zeros, a run of ones, a run of a combinations of zeros and ones, or a run of standard characters or standard symbols.

In Example 25, the subject matter of any one of Examples 21-24 can optionally include wherein the different versions comprise sequential versions originating from the current version. In Example 26, the subject matter of any one of Examples 21-25 can optionally include wherein the different versions comprise all possible versions of the pointer tag. In Example 27, the subject matter of any one of Examples 21-26 can optionally include wherein the hardware circuitry is further to, responsive to the entropy test failing to detect the patterns in the one or more other decrypted data, execute an instruction to load the first decrypted data.

In Example 28, the subject matter of any one of Examples 21-27 can optionally include wherein the hardware circuitry is further to, responsive to the entropy test detecting the patterns in the first decrypted data, execute an instruction to load the first decrypted data. In Example 29, the subject matter of any one of Examples 21-28 can optionally include wherein the encrypted data is further decrypted using a buffer size, wherein the entropy test is to detect patterns indicating a boundary between two buffers, and wherein the exception is for a boundary overflow.

Example 30 is an apparatus for facilitating tagless implicit integrity with multi-perspective pattern search, comprising means for accessing encrypted data stored in a memory hierarchy using a pointer; means for decrypting the encrypted data using a current version of a pointer tag of the pointer to yield first decrypted data; performing an entropy test on the first decrypted data; responsive to the entropy test failing to detect patterns in the first decrypted data, means for re-decrypting the encrypted data using one or more different versions of the pointer tag of the pointer to yield one or more other decrypted data; means for performing the entropy test on the one or more other decrypted versions; and responsive to the entropy test detecting the patterns in the one or more other decrypted data, means for signaling an exception with respect to the encrypted data. In Example 31, the subject matter of Example 30 can optionally include the apparatus further configured to perform the method of any one of the Examples 11 to 16.

Example 32 is at least one machine readable medium comprising a plurality of instructions that in response to being executed on a computing device, cause the computing device to carry out a method according to any one of Examples 10 to 16. Example 33 is an apparatus for facilitating tagless implicit integrity with multi-perspective pattern search, configured to perform the method of any one of Examples 10 to 16. Example 34 is an apparatus for facilitating tagless implicit integrity with multi-perspective pattern search, comprising means for performing the method of any one of Examples 10 to 16. Specifics in the Examples may be used anywhere in one or more embodiments.

In the description above, for the purposes of explanation, numerous specific details are set forth in order to provide a thorough understanding of the described embodiments. It can be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their basic form, but processes can be added to or deleted from any of the methods and information can be added or subtracted from any of the described messages without departing from the basic scope of the present embodiments. It may be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments. The various appearances of "an embodiment," "one embodiment," or "some embodiments" are not all referring to the same embodiments. It should be appreciated that in the foregoing description of example embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments utilize more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus comprising:
    one or more processors comprising hardware circuitry to:
        access encrypted data stored in a memory hierarchy using a pointer;
        decrypt the encrypted data using a current version of a pointer tag of the pointer to yield first decrypted data;
        perform an entropy test on the first decrypted data;
        responsive to the entropy test failing to detect patterns in the first decrypted data, re-decrypt the encrypted data using one or more different versions of the pointer tag of the pointer to yield one or more other decrypted data;
        perform the entropy test on the one or more other decrypted data; and
        responsive to the entropy test detecting the patterns in the one or more other decrypted data, signal an exception to the one or more processors with respect to the encrypted data.

2. The apparatus of claim 1, wherein a number of the one or more different versions is determined in accordance with a threshold number of versions.

3. The apparatus of claim 1, wherein the exception is a use-after-free exception.

4. The apparatus of claim 1, wherein the patterns comprise at least one of repeated bytes, repeated nibbles, repeated words, a run of zeros, a run of ones, a run of a combinations of zeros and ones, or a run of standard characters or standard symbols.

5. The apparatus of claim 1, wherein the one or more different versions comprise sequential versions originating from the current version.

6. The apparatus of claim 1, wherein the one or more different versions comprise all possible versions of the pointer tag.

7. The apparatus of claim 1, wherein the hardware circuitry is further to, responsive to the entropy test failing to detect the patterns in the one or more other decrypted data, execute an instruction to load the first decrypted data.

8. The apparatus of claim 1, wherein the hardware circuitry is further to, responsive to the entropy test detecting the patterns in the first decrypted data, execute an instruction to load the first decrypted data.

9. The apparatus of claim 1, wherein the encrypted data is further decrypted using a buffer size, wherein the entropy test is to detect patterns indicating a boundary between two buffers, and wherein the exception is for a boundary overflow.

10. A method comprising:
    accessing, by a processing device, encrypted data stored in a memory hierarchy using a pointer;
    decrypting the encrypted data using a current version of a pointer tag of the pointer to yield first decrypted data;
    performing an entropy test on the first decrypted data;
    responsive to the entropy test failing to detect patterns in the first decrypted data, re-decrypting the encrypted data using one or more different versions of the pointer tag of the pointer to yield one or more other decrypted data;
    performing the entropy test on the one or more other decrypted data; and
    responsive to the entropy test detecting the patterns in the one or more other decrypted data, signaling an exception with respect to the encrypted data.

11. The method of claim 10, wherein a number of the one or more different versions is determined in accordance with a threshold number of versions.

12. The method of claim 10, wherein the patterns comprise at least one of repeated bytes, repeated nibbles, repeated words, a run of zeros, a run of ones, a run of a combinations of zeros and ones, or a run of standard characters or standard symbols.

13. The method of claim 10, wherein the one or more different versions comprise sequential versions originating from the current version.

14. The method of claim 10, wherein the one or more different versions comprise all possible versions of the pointer tag.

15. The method of claim 10, further comprising responsive to the entropy test failing to detect the patterns in the one or more other decrypted data, executing an instruction to load the first decrypted data.

16. The method of claim 10, further comprising responsive to the entropy test detecting the patterns in the first decrypted data, executing an instruction to load the first decrypted data.

17. A non-transitory computer-readable storage medium having stored thereon executable computer program instructions that, when executed by one or more processors, cause the one or more processors to perform operations comprising:

accessing, by a processing device, encrypted data stored in a memory hierarchy using a pointer;

decrypting the encrypted data using a current version of a pointer tag of the pointer to yield first decrypted data;

performing an entropy test on the first decrypted data;

responsive to the entropy test failing to detect patterns in the first decrypted data, re-decrypting the encrypted data using one or more different versions of the pointer tag of the pointer to yield one or more other decrypted data;

performing the entropy test on the one or more other decrypted data; and responsive to the entropy test detecting the patterns in the one or more other decrypted data, signaling an exception to the one or more processors with respect to the encrypted data.

18. The non-transitory computer-readable storage medium of claim 17, wherein a number of the one or more different versions is determined in accordance with a threshold number of versions.

19. The non-transitory computer-readable storage medium of claim 17, wherein the patterns comprise at least one of repeated bytes, repeated nibbles, repeated words, a run of zeros, a run of ones, a run of a combinations of zeros and ones, or a run of standard characters or standard symbols.

20. The non-transitory computer-readable storage medium of claim 17, wherein the operations further comprise:

responsive to the entropy test failing to detect the patterns in the one or more other decrypted data, executing an instruction to load the first decrypted data; and responsive to the entropy test detecting the patterns in the first decrypted data, executing an instruction to load the first decrypted data.

* * * * *